United States Patent [19]
Hayes et al.

[11] Patent Number: 5,532,867
[45] Date of Patent: Jul. 2, 1996

[54] BIAS STABILIZATION CIRCUIT AND METHOD FOR A LINEARIZED DIRECTIONAL COUPLER MODULATOR

[75] Inventors: Robert R. Hayes, Calabasas; William B. Bridges, Pasadena, both of Calif.

[73] Assignee: Hughes Aircraft Company, Los Angeles, Calif.

[21] Appl. No.: 468,578

[22] Filed: Jun. 6, 1995

[51] Int. Cl.⁶ .................................. G02F 1/35; G02F 2/00
[52] U.S. Cl. ............................. 359/329; 359/332; 385/9; 385/40; 385/122
[58] Field of Search ..................................... 385/1–3, 8, 9, 385/14, 15, 40, 41, 122; 359/127, 128, 132, 326–332

[56] References Cited

U.S. PATENT DOCUMENTS

| | | | |
|---|---|---|---|
| 5,161,044 | 11/1992 | Nazarathy et al. | 359/132 X |
| 5,168,534 | 12/1992 | McBrien et al. | 385/3 |
| 5,309,532 | 5/1994 | Chang et al. | 385/3 |
| 5,369,522 | 11/1994 | Tangonan et al. | 359/329 |

OTHER PUBLICATIONS

R. V. Schmidt, "Integrated Optics Switches and Modulators", *Integrated Optics: Physics and Applications*, ed. S. Martelluci and A. N. Chester (New York: Plenum Press, 1981), [No Month] pp. 181–210.

Juan F. Lam and Gregory L. Tangonan, "A Novel Optical Modulator System with Enhanced Linearization Properties", *IEEE Photon. Tech. Lett.*, vol. 3, No. 12 (Dec. 1991), pp. 1, 102–1, 104.

*Primary Examiner*—John D. Lee
*Attorney, Agent, or Firm*—V. D. Duraiswamy; W. K. Denson-Low

[57] ABSTRACT

A circuit and method for actively stabilizing the DC bias voltages applied to passive sections of a linearized directional coupler modulator. A reference electrical signal is applied to the active section of a linearized directional coupler modulator, thereby modulating an input optical beam. An optical detector is used at the output end of the modulator to monitor the modulated optical beam. The output of the detector is sent to one or more synchronous detectors that select the one or more harmonic frequency components that one wants to suppress. The synchronous detector output is sent to a filter that converts the harmonic frequency component to a DC bias voltage, which is integrated and used to bias the passive section of the modulator. The resulting negative-feedback loop minimizes the magnitude of the particular harmonic that is selected by the filter. In a preferred embodiment, the present stabilization circuit is used to stabilize the bias voltages in a three-section linearized directional coupler modulator, resulting in a stable modulator with low second harmonic distortion and low third-order intermodulation distortion.

17 Claims, 4 Drawing Sheets

BIAS STABILIZATION CIRCUIT AND METHOD FOR A LINEARIZED DIRECTIONAL COUPLER MODULATOR

CROSS-REFERENCE TO RELATED APPLICATIONS

The present application is related to U.S. patent application Ser. No. 07/892,842 filed on Jun. 3, 1992, Now U.S. Pat. No. 5,369,522 entitled "MODULATION SYSTEM AND METHOD WITH THIRD ORDER INTERMODULATION DISTORTION REDUCTION" by Gregory L. Tangonan and Juan F. Lam, which is a continuation-in-part of Ser. No. 07/668,284, filed Mar. 12, 1991 (abondoned).

BACKGROUND OF THE INVENTION

1. Field of the Invention

This invention relates to high speed optical modulators and more specifically to linearized directional coupler modulators in which nonlinear distortion effects are suppressed.

2. Description of the Related Art

Nonlinear distortion effects are a major obstacle in the design of high speed signal transmission systems that utilize optical modulators. They set a practical limit to the dynamic range of the system. The lower end of the system's dynamic range is set by its noise floor, while the upper end is set by nonlinear effects, such as second-order harmonics and third-order intermodulation distortion (IMD).

A directional coupler modulator generally consists of two parallel waveguides that are fabricated on an electro-optic substrate in close proximity so that light launched into one waveguide (the reference arm) couples to the other waveguide (the signal arm) via evanescent coupling. If the waveguides have the same propagation constants, light launched into the reference arm will transfer completely to the signal arm in a distance $l=\pi/2\kappa$, where $\kappa$ is the coupling coefficient which describes the strength of the interguide coupling.

Electrodes are placed over the waveguides in the coupler region and, when a voltage is applied across the electrodes, electric field lines normal to the substrate surface are oppositely directed in each waveguide. The oppositely directed electric fields produce a phase mismatch (or propagation constant mismatch) by increasing the refractive index in one guide and decreasing it in the other through the linear electro-optic effect. The degree of light transfer along a given length via evanescent coupling depends on the difference in propagation constants between the waveguides. Therefore, the optical switching can be controlled with the applied electric fields. A detailed description of this device can be found in R. V. Schmidt, "Integrated Optics Switches and Modulators," in *Integrated Optics: Physics and Applications*, ed. S. Martelluci and A. N. Chester (New York: Plenum Press, 1981), pp. 181–210.

Nonlinear distortion effects arise as a result of the nonlinear nature of the modulator's energy transfer curve, as illustrated in FIG. 1. FIG. 1 illustrates the energy transfer curve for a directional coupler modulator whose waveguides are two coupling lengths long. This causes the light that is launched into the reference arm to completely couple to the signal arm and back to the reference arm before exiting the coupler, when no voltage is applied to the electrodes. It is apparent from this graph that the amount of light that exits the signal arm varies nonlinearly with applied voltage. The nonlinear nature of the energy transfer curve results in nonlinear distortion of the output signal, primarily as a result of second harmonic distortion and third-order intermodulation distortion (IMD).

Linearized directional-coupler modulators, such as the ones described in Juan F. Lam and Gregory L. Tangonan, "A Novel Optical Modulator System with Enhanced Linearization Properties", *IEEE Photo. Tech. Lett.*, vol. 3, No. 12 (1991), pp. 1,102–1,104 and in the related application mentioned above, are a special class of modulator that reduce nonlinear distortion effects.

This type of modulator, illustrated in FIG. 2, is similar to the standard modulators described above in that two parallel waveguides 10 and 12 are fabricated on a lithiumniobate electro-optic substrate 14 in close lateral proximity so that light 16 launched into one waveguide couples to the other waveguide via evanescent coupling. However, this type of modulator differs from standard modulators in that the electrodes are divided into an active section 18 and one or more passive sections 20 and 22. The active section 18 is used to modulate the optical beam 16 (with an RF source 24). Bias voltage sources 26 and 28 are used to apply DC bias voltages to passive sections 20 and 22, respectively. Proper biasing of passive sections 20 and 22 will result in a more linear energy transfer curve, which results in substantial suppression of second-order harmonics and IMD.

A problem associated with the linear directional coupler modulator is that the DC bias voltages applied to the passive sections must be very accurately controlled in order to suppress the nonlinear distortion effects. A phenomenon known as DC drift makes such accurate control difficult, especially when lithium-niobate is used as the substrate. Within minutes of setting the DC bias voltages at their optimum values, they begin to drift. This drift causes a degradation in the nonlinear distortion suppression.

SUMMARY OF THE INVENTION

In view of the above problems, the present invention provides a circuit and method for actively stabilizing the DC bias voltages applied to passive sections of a linearized directional coupler modulator.

These goals are accomplished by applying a time-varying reference voltage (pilot tone) to the active section of a linearized directional coupler modulator, thereby modulating the input optical beam. This reference voltage is added to the RF voltage that is used to modulate the optical beam during normal operation. An optical detector, located at the output end of the modulator, converts the modulated light into an electrical signal.

This electrical signal contains not only the fundamental modulation frequency, but also the higher harmonics generated by the nonlinearity of the modulator. A feedback circuit monitors the amplitude of the higher harmonics produced by the modulator, and adjusts the bias voltages on the passive section of the modulator so that the higher harmonics are suppressed.

In a preferred embodiment, a signal generator is used to modulate the active section of a three-section linearized directional coupler modulator with a distortionless sinusoidal reference voltage (pilot tone). The optical beam is modulated by the reference voltage, passes through the two passive sections and is detected at the unused exit port of the modulator by an optical detector.

The second harmonic frequency component of the optical detector signal is extracted by sending the detector signal to a switch that is driven by a control signal at twice the pilot tone frequency. The phase of the switch control signal is adjusted so that only positive half-cycles or negative half-cycles of the second harmonic component are allowed to pass through. The resulting DC voltage has an amplitude that is proportional to the amplitude of the second harmonic frequency component. The DC voltage is sent to an integrator to produce an integrated DC bias voltage that is used to bias one of the passive sections.

The third harmonic frequency component is extracted and converted to a DC bias voltage in a similar manner, and is used to bias the other passive section. The resulting feedback circuits minimize the presence of second and third harmonics in the modulated optical beam, which in turn minimizes second-order harmonic distortion and third-order IMD.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
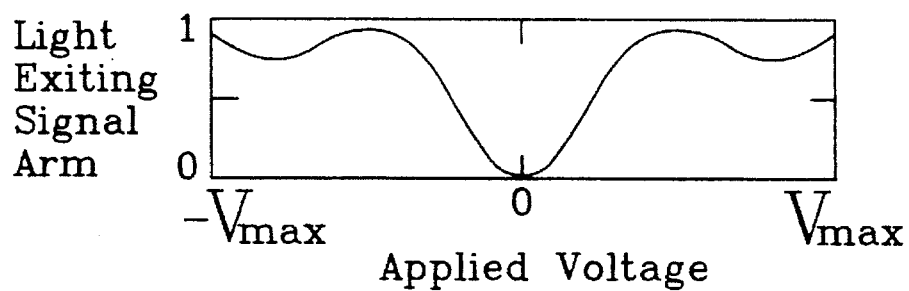
FIG. 1, described above, is a graph illustrating the energy transfer curve of a directional coupler modulator whose waveguides are two coupling lengths long.
Figure 2:
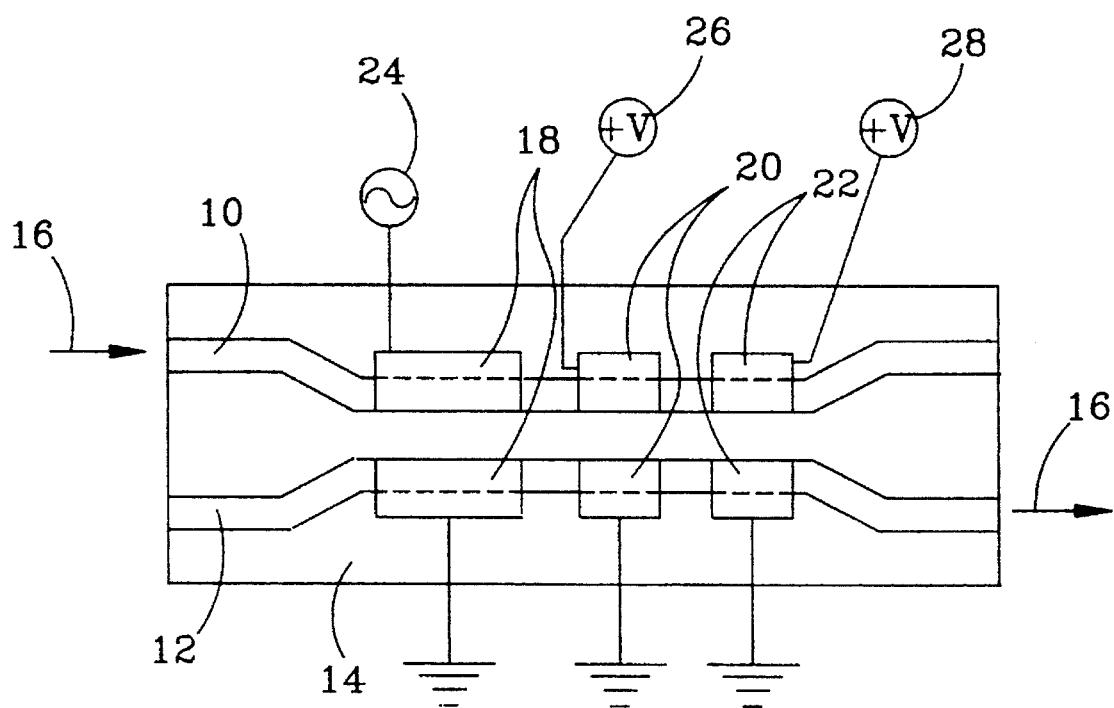
FIG. 2, described above, is a plan view of a three-section linearized directional coupler modulator.
Figure 3:
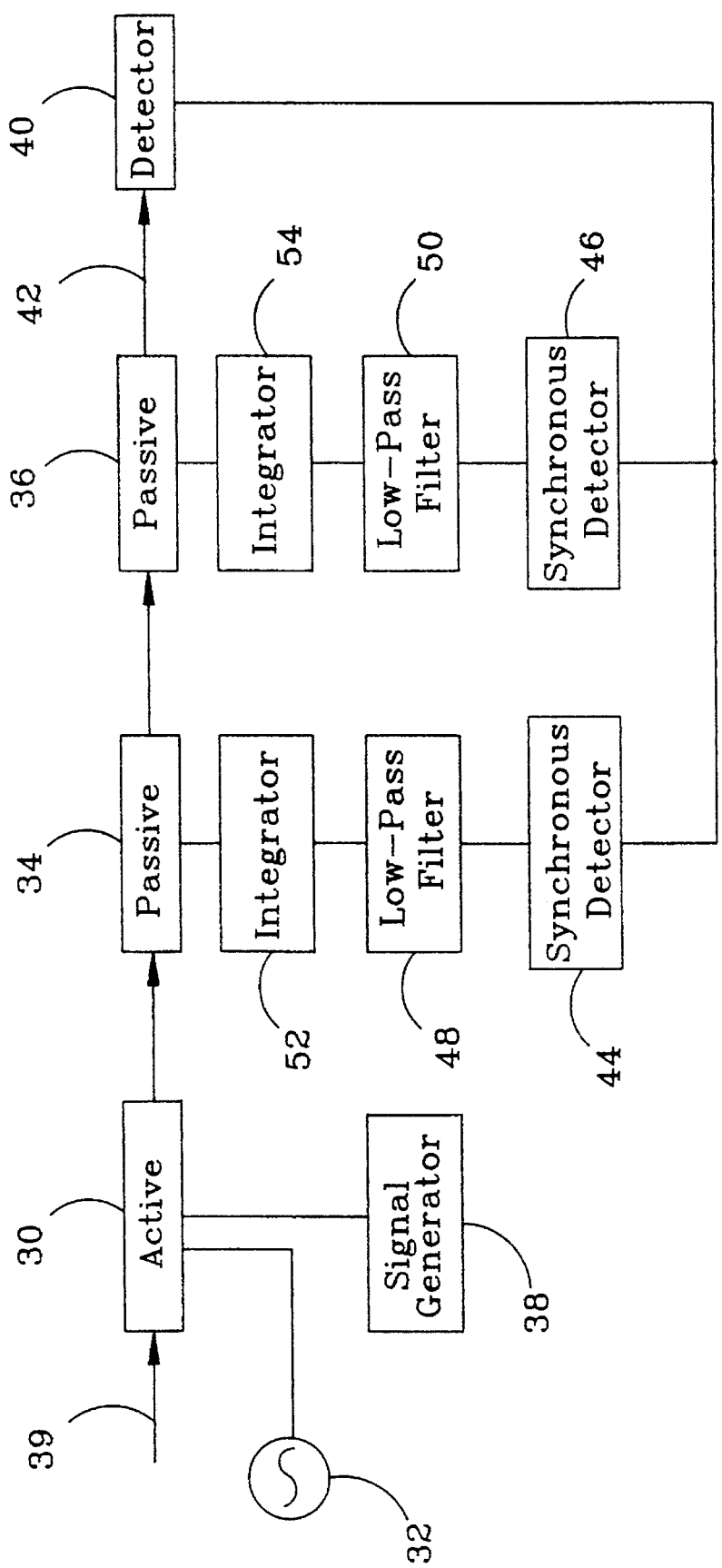
FIG. 3 is a block diagram illustrating the basic components of the bias stabilization circuit of the present invention.

FIG. 3 illustrates the basic concept of the invention, as applied to a linearized directional coupler modulator with an active section 30 that is driven by an RF source 32 and two or more passive sections 34 and 36 that are used to apply DC bias voltages to the modulator. A reference signal generator 38 is used to apply a distortionless sinusoidal reference voltage (pilot tone) to the active section 30. The pilot tone is applied on top of the RF signal (from source 32) that is normally used to drive the modulator and has a frequency that is preferably in the audio band (100 Khz or less). Although a pilot tone frequency of 100 KHz or less is preferred, any frequency may be used as long as the circuit electronics are fast enough to process it and as long as it is not so close to the main RF modulation frequency that interference occurs.

An input optical beam 39 is modulated by the active section 30 at both the main RF modulation frequency generated by the RF modulation source 32 and at the pilot tone frequency generated by signal generator 38. The modulated optical beam passes through the one or more passive sections 34 and 36 and an optical detector 40 monitors the modulated output beam 42. The resulting detector signal is sent to one or more synchronous detection circuits 44 and 46 which, through time-synchronized on-off switching, repetitively sample the first half-cycle of the desired harmonic components. The "time-Windowed" signals have DC components that are proportional to the amplitude (with the correct sign) of their respective harmonic component. The "time-windowed" signals are sent to integrators 52 and 54, which slowly ramp up or down in voltage (according to the sign of the amplitude of the DC components) until their output voltages, which are used to bias the passive sections, reach the correct values for nulling their respective harmonic component. When the harmonic components are nulled, the input to integrators 52 and 54 become zero, and the output voltages (bias voltages) are held constant.

Integrators 52 and 54 act as low-pass filters so that their output voltages are minimally affected by the AC components of the "time-windowed" signals. However, low-pass filters 48 and 50, may be optionally used between synchronous detection circuits 44 and 46 and integrators 52 and 54 to insure that out all but the desired DC components are filtered out.

As mentioned above, the amplitude of each harmonic component is a function of the bias voltages $V_1$ and $V_2$ applied to passive sections 34 and 36, respectively. The inventors have found that this dependence is approximately linear, so that one can write each amplitude as $$A_{2\omega} = m_{11}V_1 + m_{12}V_2 + C_1 \qquad (1)$$

$$A_{3\omega} = m_{21}V_1 + m_{22}V_2 + C_2 \qquad (2)$$

where $A_{n\omega}$ is the amplitude of each harmonic component, and the m's and c's are coefficients that are defined by the physical parameters of the modulator. Equations (1) and (2) are the equations of planes in a 3-dimensional parameter space, with the $A_{n\omega}$'s, $V_1$ and $V_2$ corresponding to the z, x and y axes, respectively. Mathematically, the optimum bias voltages $V_1$ and $V_2$ are found by setting $A_{2\omega}$ and $A_{3\omega}$ equal to zero, and solving the resulting two equations for the two unknowns $V_1$ and $V_2$. The purpose of the feedback circuits described is to solve these equations automatically and continuously in an analog fashion, so that the harmonic components are always hulled, even if the m and c coefficients change over time as a result of temperature changes.

It is important to realize that the amplitudes of the harmonic components may be either positive, zero or negative. In order to find the zeros electronically, one must be able to determine the sign as well as the magnitude of the harmonic component amplitude. This cannot be done with simple filtering and rectification techniques, which determine only the magnitude of a sinusoidal signal. However, the synchronous detection (phase-lock) circuits described above can determine magnitude and sign.

The circuits minimize the magnitudes of the harmonic components that are selected by synchronous detectors 44 and 46. By minimizing the magnitudes of the harmonic components of the pilot tone frequency, respective harmonic components of other modulation frequencies are also suppressed. For example, if the second and third harmonics of the pilot tone frequency are suppressed, the second and third harmonics of the RF modulation frequency are also suppressed. Although two passive sections 36 and 38 with respective stabilization circuits are illustrated, the present invention may be used to stabilize a directional coupler with any number of passive sections (each passive section is used to minimize one frequency harmonic).

The pilot tone has a frequency that is preferably in the audio band (100 Khz or less). However, any pilot tone frequency may be used as long as the electronics (detector 40, synchronous detectors 44 and 46, low-pass filters 48 and 50 and integrators 52 and 54) are fast enough to process it and as long as it is not so close to the main RF modulation frequency that interference occurs.

Figure 4:
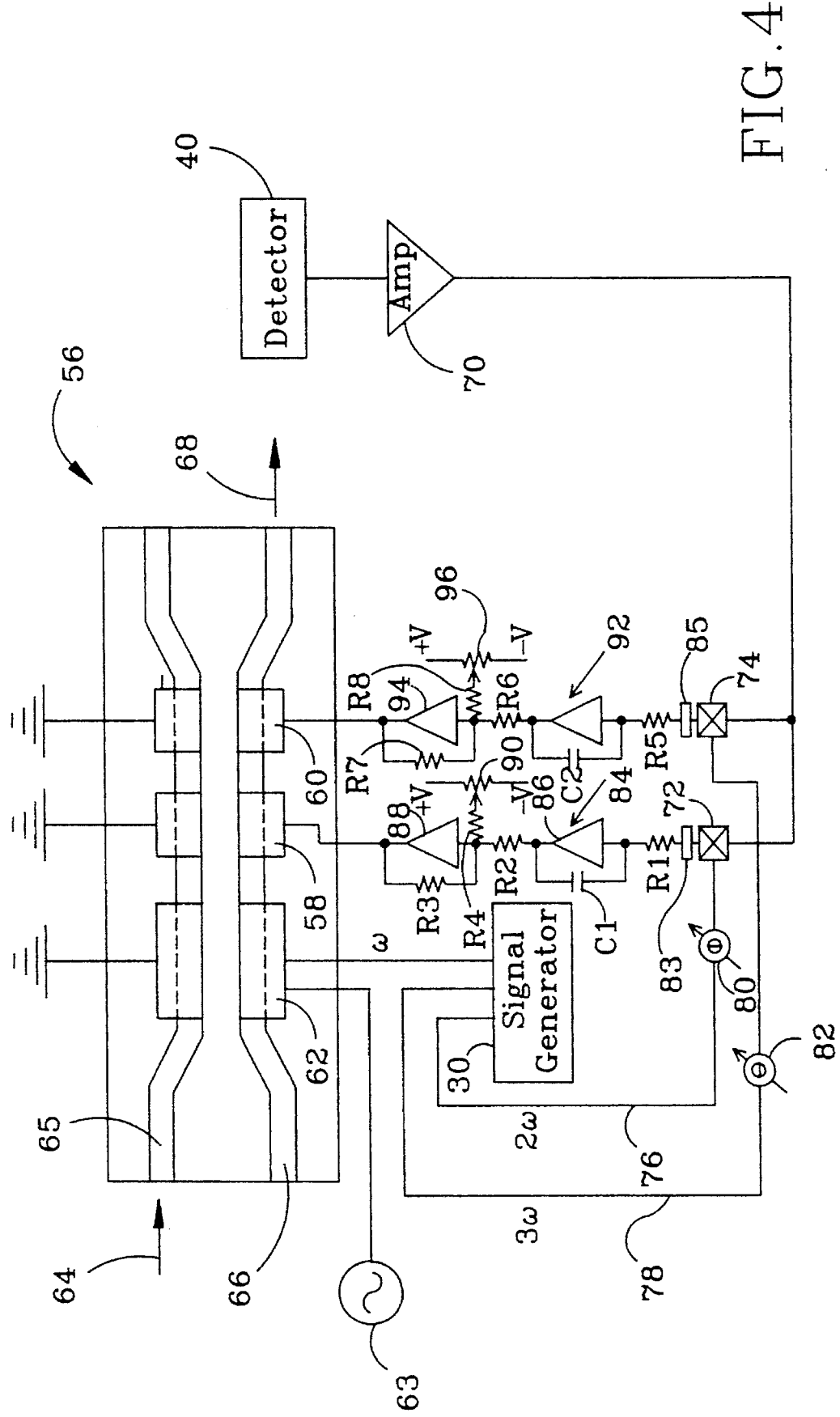
FIG. 4 is a circuit diagram illustrating a preferred bias stabilization circuit for a three-section linearized directional coupler modulator.

FIG. 4 illustrates a preferred implementation of the bias stabilization circuit used for stabilizing the bias voltages of a three-section linearized directional coupler modulator 56. The operation of the linearized directional coupler modulator is described in the Lam and Tangonan article mentioned previously and in co-pending application Ser. No. 07/892,842(Now U.S. Pat. No. 5,369,522). As described above, the bias voltages applied to bias electrodes 58 and 60 must be very accurately controlled in order to suppress nonlinear distortion effects. In the three-section modulator 56, the first bias electrode 58 is used to suppress second-order harmonics while the second bias electrode 60 is used to suppress third-order harmonics (which in turn suppress third-order IMD).

The operation of the bias stabilization circuit will now be described. A signal generator (pilot tone generator) 30 is used to generate and apply a pilot tone, preferably a sinusoidal voltage at frequency $\omega$, to active electrode 62. and to also generate switch control signals 76 and 78 at frequencies $2\omega$ and $3\omega$, respectively. As mentioned above, the pilot tone is applied on top of the normal RF modulation signal applied by RF source 63. An input light beam 64 is launched into one of the two waveguides 65 and 66, that are fabricated on an electro-optic substrate 67. The input light beam 64 is modulated by the active electrode 62 at the RF modulation frequency and at the pilot tone frequency, and passes through passive electrodes 58 and 60 before exiting the modulator. An Optical detector 40 is used to detect the modulated output beam 68. The detector signal is preferably amplified with a standard operational amplifier (op-amp) 70 and sent to switches 72 and 74, which are preferably implemented with CMOS integrated circuits.

Switch control signals 76 and 78 are sent to phase shifters 80 and 82, and switches 72 and 74, respectively. Phase shifters 80 and 82 are used to adjust the phases of the switch control signals. Since switches 72 and 74 are driven by switch control signals having frequencies $2\omega$ and $3\omega$, respectively, the switches will pass the second and third harmonics, respectively, of the portion of the detector signal that corresponds to the pilot tone frequency. The phases of the multiplier outputs (the switch control signals) are adjusted so that only the first half-cycle of the second and third harmonics pass through switches 72 and 74. The resulting switch output voltages have DC components that are proportional to the amplitude of their respective harmonic frequency component.

The processing of the synchronous switch output voltage corresponding to the second frequency harmonic of the reference signal frequency (switch 72) will now be described. The output voltage of switch 72 is sent to integrator 84, which integrates the switch's output voltage. Integrator 84 is preferably implemented with a standard op-amp 86, capacitor $C_1$ and resistor $R_1$. The values of resistors $R_2$ and $R_3$, which are respectively connected at the input of and across op-amp 88, may be adjusted so that op-amp 88 operates with either unity gain or any additional required gain. As explained above, integrator 84 acts as a low-pass filter, so that its output is minimally affected by the AC components of the switch's 72 output voltage. However, a low pass filter 83 may be optionally used to filter out all but the DC components.

The output of op-amp 88 is used to bias electrode 58. In the preferred embodiment, the input to op-amp 88 is connected through resistor $R_4$ to a potentiometer 90. The potentiometer is used to apply an initial DC bias voltage to op-amp 88, which in turn applies this voltage to electrode 58. The initial DC bias voltage is chosen to approximately null the magnitude of the second harmonic frequency component. As the initial DC bias voltage begins to drift over time, the magnitude of the second harmonic component increases. The stabilization circuit described above detects the increase in the second harmonic and makes adjustments to the DC bias voltage to bring the magnitude of the second harmonic back down. When the correct DC bias voltage magnitude is found, the integrator holds that voltage until further correction is needed.

The processing of the output voltage corresponding to the third frequency harmonic (switch 74) is substantially the same, with the operation of filter 85, integrator 92, op-amp 94 and potentiometer 96 corresponding generally to the operation of filter 83, integrator 84, op-amp 88 and potentiometer 90, respectively, capacitor $C_2$ corresponding to $C_1$, and resistors $R_5, R_6, R_7$ and $R_8$ corresponding respectively to $R_1, R_2, R_3$ and $R_4$. Potentiometer 96 is used to set the initial DC bias voltage needed to approximately null the magnitude of the third harmonic frequency component. In order to avoid any competitive interaction between the circuit controlling electrode 58 and the circuit controlling electrode 60, the integration time constant (RC time constant) for one is preferably made much longer than the integration time constant of the other. This is preferably accomplished by choosing appropriate values for capacitors $C_1$ and $C_2$, and their respective resistors $R_1$ and $R_5$. For example if a 1 KHz reference signal frequency is used, the values of $C_1, C_2, R_1$ and $R_5$ are preferably chosen so that RC time constants of 10 seconds and 1 second are achieved for the second harmonic and third harmonic circuits, respectively.

Figure 5:
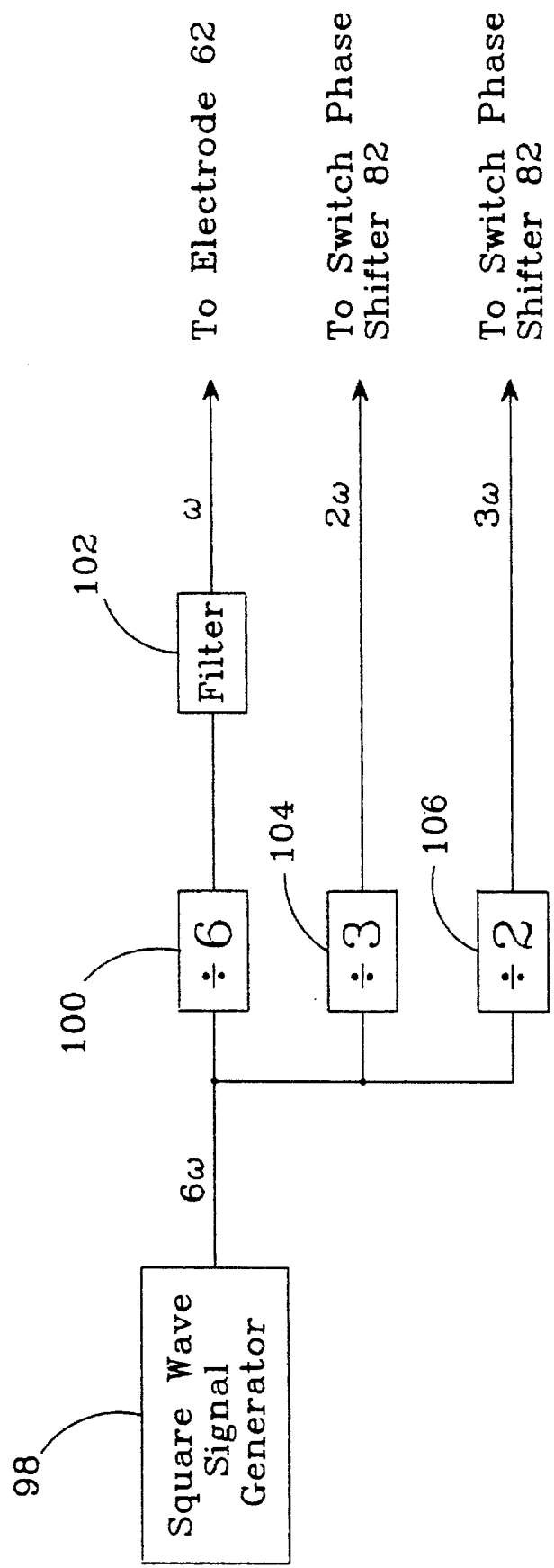
FIG. 5 is a block diagram illustrating a preferred embodiment of a signal generator used in the bias stabilization circuit of FIG. 4.

FIG. 5 illustrates a preferred implementation of signal generator 30. A digital square-wave signal generator 98 generates a square-wave voltage at frequency $6\omega$. A portion of the $6\omega$ signal is sent to a divide-by-six circuit 100, which divides its frequency by a factor of six. The output signal from circuit 100 (now at frequency $\omega$) is then passed through a tuned filter 102 that converts its square-wave shape to a sinusoid-shape. The sinusoid output signal at frequency $\omega$ is sent to electrode 62 and is used as the pilot tone.

A second portion of the $6\omega$ signal is sent to a divide-by-3 circuit 104 that converts its frequency to $2\omega$. A third portion of the $6\omega$ signal is sent to a divide-by-2 circuit 106 that converts its frequency to $3\omega$. The $2\omega$ and $3\omega$ digital square-wave signals are sent to phase shifters 80 and 82, respectively. For digital square-wave signals, phase shifters 80 and 82 are preferably implemented with well-known time delay circuits.

While several illustrative embodiments of the invention have been shown and described, numerous variations and alternate embodiments will occur to those skilled in the art. Although the invention was illustrated with a three-section linearized directional coupler modulator, the bias stabilization circuit and method may be utilized with any number of passive sections. For example, if one desires to minimize the magnitudes of the second, third and fourth harmonics, one could use a four-section modulator (three passive sections) with the present bias stabilization circuit applied to all three passive sections. In addition, the gain and time constants of each of the separate bias circuits may be adjusted to accommodate particular device requirements. Such variations and alternate embodiments are contemplated, and can be made without departing from the spirit and scope of the appended claims.

We claim:

1. A system for biasing an electro-optic directional coupler modulator, said modulator comprising a first active section for actively modulating an optical beam in accordance with a modulation signal and at least two passive sections for controlling the linearity of said modulator, comprising:

a signal generator for delivering a reference modulation signal (pilot tone) to said active section, thereby modulating an optical beam, an optical detector that detects said modulated optical beam, and generates an AC electrical signal with a frequency that corresponds to the modulation of said optical beam, and at least two negative feedback circuit that generate respective bias signals in response to at least two non-zero order harmonic frequency components in said modulated optical beam, each of said feedback circuits applying its respective bias signal to a respective one of said at least two passive section to counter said harmonic frequency components each of said feedback circuits comprising a synchronous detector that selects a respective one of said nonzero order harmonic frequency components of said AC electrical siqnal, and an integrator that integrates the value of a DC voltage component of the harmonic frequency component selected by said synchronous detector and applies an integrated DC bias voltage that correspond to said integrated DC voltage component to its respective passive modulator section, said integrator having different integration time constants to reduce competitive interactions between said at least two negative feedback circuits.

2. The system of claim 1, further comprising a filter between the synchronous detector and integrator in each of said negative feedback circuits that filters out all but said DC voltage components from said harmonic frequency components.

3. A linearized directional coupler modulator, comprising:

an electro-optic substrate with an index of refraction that can be varied with the application of an electric field, first and second optical waveguides on said substrate that are parallel and in close lateral proximity to each other, so that an optical beam launched into an input end of the first waveguide couples between said waveguides via evanescent coupling and exits through an output end of one or both of said waveguides, an active electrode along a first portion of said waveguides for modulating evanescent coupling between said waveguides along said first portion, at least two passive electrodes along at least two other portions of said waveguides for applying respective bias voltages across said other waveguide portions to control the linearity of said modulator, a pilot tone generator for generating and applying a reference electrical signal (pilot tone) at frequency $\omega$ to said active electrode for modulating the evanescent coupling between said waveguides, thereby modulating said optical beam, an optical detector that monitors said modulated optical beam, and generates an AC electrical signal with a frequency that corresponds to a modulation frequency of said optical beam, and at least two negative feedback circuits that generate said respective bias voltages in response to at least two non-zero order harmonic frequency components in said modulated optical beam, each of said feedback circuits applying its respective bias voltage to a respective One Of said at least two passive electrodes to counter said non-zero order harmonic frequency components, each of said feedback circuits comprising a synchronous detector that selects a respective one of said non-zero order harmonic frequency components of said AC electrical signal, and an integrator that integrates the value of a DC voltage component of the harmonic frequency component selected by said Synchronous detector and applies an integrated DC bias voltage that corresponds to said integrated DC voltage component to its respective passive modulator section, said integrators having different integration time constants to reduce competitive interactions between said at least two negative feedback circuits.

4. The modulator of claim 3, further comprising a filter between the synchronous detector and integrator in each of said negative feedback circuits that filters out all but said DC voltage components from said harmonic frequency components.

5. The modulator of claim 4, wherein said at least two passive electrodes comprise first and second passive electrodes along second and third portions of said waveguides, respectively, and wherein Said at least two negative feedback circuits comprise:

first and second synchronous detectors that select second and third harmonic frequency components of said AC electrical signal, respectively, first and second low-pass filters that pass first and second DC voltage components of said second and third harmonic frequency components, respectively, and first and second integrating op-amps that integrate said first and second DC voltage components, and output first and second DC bias voltages, respectively, said first and second passive electrodes being connected to apply said first and second DC bias voltages across said second and third waveguide portions, respectively, with said optical detector, synchronous detectors, filters and integrating op-amps forming first and second negative feedback loops that counter said second and third harmonic frequency components in said modulated optical beam.

6. The modulator of claim 5, wherein each of said synchronous detectors comprise:

an electrical switch for receiving said AC electrical signal, and a square-wave signal generator for generating and delivering a digital square-wave control signal to said switch, said control signal having a frequency that corresponds to the frequency of the switch's respective harmonic frequency component and having a phase so that the first half-cycle of said harmonic frequency component is allowed to pass through said switch.

7. The modulator of claim 6, further comprising first and second variable DC voltage sources for applying initial DC bias voltages across said second and third waveguide portions, respectively.

8. The modulator of claim 6, wherein, said pilot tone generator and said square-wave signal generator are implemented with a common signal generator, said signal generator comprising:

a digital square-wave signal generator for generating a square-wave signal at frequency $6\omega$, a divide-by-6 circuit for converting a portion of said square-wave signal to a square-wave pilot tone signal at frequency $\omega$, a filter for converting said square-wave pilot tone signal to a sinusoid pilot tone signal, a divide-by-3 circuit for converting the frequency of a second portion of said square-wave signal to a first square-wave control signal at frequency $2\omega$, and a divide-by-2 circuit for converting the frequency of a third portion of said square-wave signal to a second square-wave control signal at frequency $3\omega$.

9. The modulator of claim 6, wherein said electrical switches comprise CMOS switches.

10. The modulator of claim 3, further comprising an amplifier for amplifying said AC electrical signal.

11. The modulator of claim 3, wherein each of said integrators comprises an integrating op-amp.

12. A method of biasing an electro-optic directional coupler modulator, said modulator comprising a first active section for actively modulating an optical signal in accordance with a modulation signal, and at least two passive sections for controlling the linearity of said modulator, comprising the steps of:

delivering a reference modulation signal to said active section to modulate an optical beam, detecting said modulated optical beam, generating an AC electrical signal with a frequency that corresponds to a modulation frequency of said optical beam, selecting at least two non-zero order harmonic frequency components of said AC electrical signal, converting each of said harmonic frequency components to a respective DC bias voltage, integrating the value of each of said DC bias voltages, and applying each of said integrated bias voltages to a respective one of said at least two passive sections to suppress each of said at least two harmonic frequency components.

13. The method of claim 12, wherein second and third harmonic frequency components are suppressed in said modulator by:

passing said AC electrical signal through first and second synchronous detectors that select second and third harmonic frequency components, respectively, of said AC electrical signal, converting said second and third harmonic frequency components to first and second DC bias voltages, integrating the value of said first and second DC bias voltages, and applying said first and second integrated bias voltages to first and second passive modulator sections, respectively.

14. A linearized directional coupler modulator, comprising:

an electro-optic substrate with an index of refraction that can be varied with the application of an electric field, first and second optical waveguides on said substrate that are parallel and in close lateral proximity to each other, so that an optical beam launched into an input end of the first waveguide couples between said waveguides via evanescent coupling and exits through an output end of one or both of said waveguides, an active electrode along a first portion of said waveguides for modulating evanescent coupling between said waveguides along said first portion, first and second passive electrodes along second and third portions of said waveguides, respectively, a pilot tone generator for generating and applying a reference electrical signal (pilot tone) at frequency $\omega$ to said active electrode for modulating the evanescent coupling between said waveguides, thereby modulating said optical beam, an optical detector that monitors said modulated optical beam, and generates an AC electrical signal with a frequency that corresponds to a modulation frequency of said optical beam, first and second synchronous detectors for selecting second and third harmonic frequency components of said AC electrical signal, respectively, first and second low-pass filters for passing first and second DC voltage components of said second and third harmonic frequency components, respectively, and first and second integrating op-amps for integrating said first and second DC voltage components, and outputting first and second DC bias voltages, respectively, said first and second passive electrodes being connected to apply said first and second DC bias voltages across said second and third waveguide portions, respectively, with said optical detector, synchronous detectors, filters and integrating op-amps forming first and second negative feedback loops that counter said second and third harmonic frequency components in said modulated optical beam, each of said synchronous detectors comprising an electrical switch that receives said AC electrical signal, and a square-wave signal generator that generates and delivers a digital square-wave control signal to said switch, said control signal having a frequency that corresponds to the frequency of the switch's respective harmonic frequency component and having a phase so that the first half-cycle of said harmonic frequency component is allowed to pass through said switch.

15. The modulator of claim 14, further comprising first and second variable DC voltage sources for applying initial DC bias voltages across said second and third waveguide portions, respectively.

16. The modulator of claim 14, wherein said pilot tone generator and said square-wave signal generator are implemented with a common signal generator, said signal generator comprising:

a digital square-wave signal generator for generating a square-wave signal at frequency $6\omega$, a divide-by-6 circuit for converting a portion of said square-wave signal to a square-wave pilot tone signal at frequency $\omega$, a filter for converting said square-wave pilot tone signal to a sinusoid pilot tone signal, a divide-by-3 circuit for converting the frequency of a second portion of said square-wave signal to a first square-wave control signal at frequency $2\omega$, and a divide-by-2 circuit for converting the frequency of a third portion of said square-wave signal to a second square-wave control signal at frequency $3\omega$.

17. The modulator of claim 14, wherein said electrical switches comprise CMOS switches.

\* \* \* \* \*